United States Patent
Bennett et al.

(10) Patent No.: US 9,710,655 B2
(45) Date of Patent: *Jul. 18, 2017

(54) CONTROLLED DELIVERY AND ASSESSING OF SECURITY VULNERABILITIES

(71) Applicant: International Business Machines Corporation, Armonk, NY (US)

(72) Inventors: Margaret M. Bennett, Markham (CA); Barbara J. Bryant, Clinton Corners, NY (US); William E. Spencer, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,277

(22) Filed: Oct. 20, 2016

(65) Prior Publication Data

US 2017/0147823 A1 May 25, 2017

Related U.S. Application Data

(63) Continuation of application No. 15/142,004, filed on Apr. 29, 2016, which is a continuation of application No. 14/950,226, filed on Nov. 24, 2015.

(51) Int. Cl.
*G06F 21/10* (2013.01)
*H04L 29/06* (2006.01)
*G06F 21/57* (2013.01)

(52) U.S. Cl.
CPC .......... *G06F 21/577* (2013.01); *H04L 63/083* (2013.01); *H04L 63/10* (2013.01)

(58) Field of Classification Search
None
See application file for complete search history.

(56) References Cited

U.S. PATENT DOCUMENTS 6,185,689 B1 * 2/2001 Todd, Sr. .............. G06F 21/577
  705/53
6,233,576 B1   5/2001 Lewis
(Continued)

FOREIGN PATENT DOCUMENTS

JP  2007220040 A   8/2007
WO  2010056379 A1  5/2010

OTHER PUBLICATIONS

"Vulnerability Assessment Whitepaper", no date provided, Beyond Security, p. 1-12.*

(Continued)

*Primary Examiner* — Christopher Revak
(74) *Attorney, Agent, or Firm* — Reza Sarbakhsh

(57) ABSTRACT

A method for providing security vulnerability information is provided. The method may include checking for the security vulnerability information product supplier servers. The method may further include sending alerts to a security vulnerability administrator associated with a client environment. Additionally, the method may include performing a security check on the security vulnerability administrator to authorize the security vulnerability administrator to receive the security vulnerability information. The method may also include authenticating customers associated with the client environment to authorize the customers to receive the security vulnerability information. The method may further include prompting the authorized security vulnerability administrator to acknowledge an information confidentiality reminder. The method may also include sending an audit record to the product supplier server. The method may further include presenting the security vulnerability information to the authorized security vulnerability administrator and the authorized customers associated with the client environment.

1 Claim, 5 Drawing Sheets

(56) References Cited

U.S. PATENT DOCUMENTS

| | | | |
|---|---|---|---|
| 6,662,228 B1* | 12/2003 | Limsico | H04L 63/04 709/225 |
| 7,584,503 B1 | 9/2009 | Palmer et al. | |
| 7,743,421 B2 | 6/2010 | Cosquer et al. | |
| 7,797,752 B1* | 9/2010 | Vaidya | H04L 12/4641 717/170 |
| 8,353,043 B2 | 1/2013 | Kim et al. | |
| 9,531,728 B1 | 12/2016 | Bennett et al. | |
| 2003/0069767 A1 | 4/2003 | Menninger | |
| 2003/0128822 A1 | 7/2003 | Leivo et al. | |
| 2004/0083286 A1* | 4/2004 | Holden | G06F 21/31 709/225 |
| 2005/0050377 A1 | 3/2005 | Chan et al. | |
| 2005/0160286 A1 | 7/2005 | Currie et al. | |
| 2005/0257268 A1 | 11/2005 | Guo et al. | |
| 2006/0080653 A1* | 4/2006 | Siwatu | G06F 8/61 717/173 |
| 2007/0136437 A1 | 6/2007 | Shankar et al. | |
| 2007/0136622 A1 | 6/2007 | Price et al. | |
| 2007/0143827 A1* | 6/2007 | Nicodemus | G06F 21/6218 726/2 |
| 2008/0028464 A1 | 1/2008 | Bringle et al. | |
| 2008/0046964 A1 | 2/2008 | Muralidharan et al. | |
| 2008/0209138 A1 | 8/2008 | Sheldon et al. | |
| 2008/0222731 A1 | 9/2008 | Dowd et al. | |
| 2009/0084809 A1 | 4/2009 | Timmermans et al. | |
| 2009/0100522 A1 | 4/2009 | Kim et al. | |
| 2011/0261699 A1 | 10/2011 | Nishida | |
| 2012/0311715 A1 | 12/2012 | Tal et al. | |
| 2012/0317491 A1 | 12/2012 | Wong et al. | |
| 2013/0041761 A1 | 2/2013 | Voda | |
| 2013/0111500 A1 | 5/2013 | Dixon et al. | |
| 2013/0298182 A1* | 11/2013 | May | H04L 63/0272 726/1 |
| 2016/0099963 A1* | 4/2016 | Mahaffey | H04L 63/1433 726/25 |

OTHER PUBLICATIONS

"What is a Vulnerability Assessment?", Jul. 11, 2011, Demyo Inc., p. 1-21.*

Scarfone et al, "Technical Guide to Information Security Testing and Assessment," Sep. 2008, NIST Special Publication 800-115, p. 1-80.*

"Vulnerability Assessment", no date provded, Syngress, Chapter 1, p. 1-26.*

"BYOD and Multivendor Networks Raise the Vulnerability Ante: 10 Ways to Fight Back!", 2013, GFI LanGuard, p. 1-9.*

Mell et al, "Creating a Patch and Vulnerability Management Program", Nov. 2005, NIST Special Publication 800-40, Version 2.0, p. 1-76.*

Gansler et al., "Information Assurance: Trends in Vulnerabilities, Threats, and Technologies," National Defense University Center for Technology and National Security Policy, 2004, p. 1-146, Washington, D.C.

Lodin, "Enterprise Security Vulnerability Management," Pondurance Whitepaper, 2012, p. 1-11, Pondurance LLC.

Lu et al., "From Security to Vulnerability: Data Authentication Undermines Message Delivery in Smart Grid," The 2011 Military Communications Conference, 2011, p. 1183-1188, Track 3: Cyber Security and Network Operations, IEEE.

Mell et al., "The NIST Definition of Cloud Computing," National Institute of Standards and Technology, Sep. 2011, p. 1-3, Special Publication 800-145.

Naedele, "Addressing IT Security for Critical Control Systems," Proceedings of the 40th Hawaii International Conference on System Sciences, 2007, p. 1-9, IEEE.

NSTB, "Common Cyber Security Vulnerabilities Observed in Control System Assessments by the INL NSTB Program," Idaho National Laboratory Report, Nov. 2008, p. 1-43, INL/EXT-08-13979, U.S. Department of Energy.

Qualys, "On-Demand Security Audits and Vulnerability Management: A Proactive Approach to Network Security," Qualys Whitepaper, 2003, p. 1-31, Qualys Inc.

Wang et al., "TaintScope: A Checksum-Aware Directed Fuzzing Tool for Automatic Software Vulnerability Detection," IEEE Symposium on Security and Privacy, 2010, p. 497-512, IEEE Computer Society.

Wikipedia, "Windows Update," Wikipedia: the Free Encyclopedia, Last Modified on Oct. 1, 2015, p. 1-8, https://en.wikipedia.org/wiki/Windows_Update, Accessed on Oct. 6, 2015.

IBM, "List of IBM Patents or Patent Applications Treated as Related (Appendix P)," Jan. 13, 2017, p. 1-2.

Bennett et al., "Controlled Delivery and Assessing of Security Vulnerabilities," Application and Drawings, filed Nov. 24, 2015, 33 Pages, U.S. Appl. No. 14/950,226.

Bennett et al., "Controlled Delivery and Assessing of Security Vulnerabilities," Application and Drawings, filed Oct. 20, 2016, 29 Pages, U.S. Appl. No. 15/298,282.

* cited by examiner

CONTROLLED DELIVERY AND ASSESSING OF SECURITY VULNERABILITIES

BACKGROUND

The present invention relates generally to the field of computing, and more specifically, to system security.

Generally, IT environments maintain proper security measures by staying abreast of the latest recommended security and integrity vulnerability patches for systems and ensuring that the security patches are quickly deployed. Furthermore, product security vulnerability information may be delivered according to methods that include a public security bulletin and advisory on support portals, as well as a targeted communications method. The targeted communication notification method allows the information to be delivered in a controlled manner to authorized representatives of clients by maintaining a contact notification list of authorized personnel to ensure that the proper person in the client environment is notified of the vulnerability.

SUMMARY

A method for providing a plurality of security vulnerability information is provided. The method may include receiving a plurality of first events. The method may include checking for the plurality of security vulnerability information on at least one product supplier server. The method may further include in response to finding the plurality of security vulnerability information on the at least one product supplier server, sending at least one alert to at least one security vulnerability administrator associated with a client environment. Additionally, the method may include performing at least one security check on the at least one security vulnerability administrator to authorize the at least one security vulnerability administrator to receive the plurality of security vulnerability information. The method may also include authenticating at least one customer associated with the client environment to authorize the at least one customer to receive the plurality of security vulnerability information. The method may further include prompting the authorized at least one security vulnerability administrator to acknowledge an information confidentiality reminder to receive the plurality of security vulnerability information. The method may also include in response to the authorized at least one security vulnerability administrator acknowledging the information confidentiality reminder, sending an audit record to the at least one product supplier server. The method may further include presenting the plurality of security vulnerability information to the authorized at least one security vulnerability administrator and the authorized at least one customer associated with the client environment.

A computer system for providing a plurality of security vulnerability information is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include checking for the plurality of security vulnerability information on at least one product supplier server. The method may further include in response to finding the plurality of security vulnerability information on the at least one product supplier server, sending at least one alert to at least one security vulnerability administrator associated with a client environment. Additionally, the method may include performing at least one security check on the at least one security vulnerability administrator to authorize the at least one security vulnerability administrator to receive the plurality of security vulnerability information. The method may also include authenticating at least one customer associated with the client environment to authorize the at least one customer to receive the plurality of security vulnerability information. The method may further include prompting the authorized at least one security vulnerability administrator to acknowledge an information confidentiality reminder to receive the plurality of security vulnerability information. The method may also include in response to the authorized at least one security vulnerability administrator acknowledging the information confidentiality reminder, sending an audit record to the at least one product supplier server. The method may further include presenting the plurality of security vulnerability information to the authorized at least one security vulnerability administrator and the authorized at least one customer associated with the client environment.

A computer program product for providing a plurality of security vulnerability information is provided. The computer program product may include one or more computer-readable storage devices and program instructions stored on at least one of the one or more tangible storage devices, the program instructions executable by a processor. The computer program product may include program instructions to check for the plurality of security vulnerability information on at least one product supplier server. The computer program product may also include in response to finding the plurality of security vulnerability information on the at least one product supplier server, program instructions to send at least one alert to at least one security vulnerability administrator associated with a client environment. Additionally, the computer program product may include program instructions to perform at least one security check on the at least one security vulnerability administrator to authorize the at least one security vulnerability administrator to receive the plurality of security vulnerability information. The computer program product may further include program instructions to authenticate at least one customer associated with the client environment to authorize the at least one customer to receive the plurality of security vulnerability information. The computer program product may also include program instructions to prompt the authorized at least one security vulnerability administrator to acknowledge an information confidentiality reminder to receive the plurality of security vulnerability information. The computer program product may further include in response to the authorized at least one security vulnerability administrator acknowledging the information confidentiality reminder, program instructions to send an audit record to the at least one product supplier server. The computer program product may also include program instructions to present the plurality of security vulnerability information to the authorized at least one security vulnerability administrator and the authorized at least one customer associated with the client environment.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
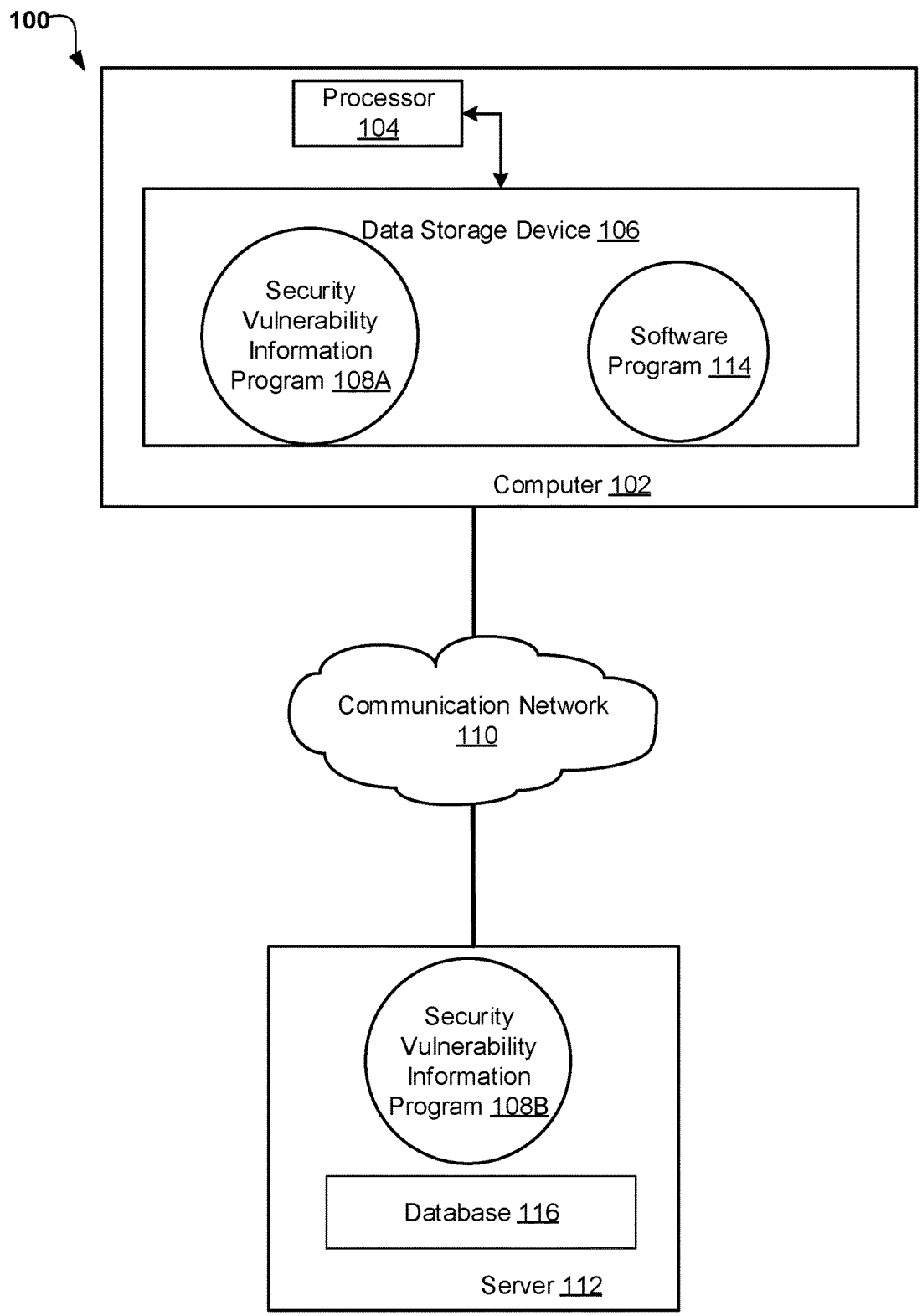
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to product security vulnerability information. The following described exemplary embodiments provide a system, method and program product for providing new security vulnerability information to client environments. Therefore, the present embodiment has the capacity to improve the technical field associated with product security by checking for security vulnerabilities and presenting the security vulnerabilities to administrators and customers by verifying credentials associated with the administrators and customers. Specifically, the present embodiment may check for new security vulnerabilities, perform security checks on administrators and customers to provide the new security vulnerabilities information to the administrators and customers, and generate audit records as receipt of the new security vulnerabilities information.

As previously described with respect to system security, product security vulnerability information may be delivered using public security technical bulletins and advisories as well as targeted communication notifications. However, because product security vulnerability information is publicly available using the public security technical bulletins and advisories method, clients are vulnerable to security breaches until the security vulnerability patch is deployed in the clients' environment. Furthermore, customers must review bulletins and advisories constantly to ensure their systems are up to date. Also, with the targeted communication notification method, the information to be delivered may be in a controlled manner, but it requires the product supplier to maintain a list of authorized personnel to ensure that the proper person in the client environment is notified of the vulnerability. Specifically, the notification list must be accurate at all times, which may be difficult due to changing customer and authorized personnel lists. Furthermore, the customers must retrieve the information, so the information may not be distributed in a timely manner. Additionally, current methods of delivering security vulnerabilities (public website or secure portal) do not provide an audit trail, so there is an inability to track if/when the information is received by clients. As such, it may be advantageous, among other things, to provide a system, method and program product for providing security vulnerability information to client environments via trusted security administrators. Specifically, the system, method and program product may check for new security vulnerabilities, perform security checks on administrators and customers, provide the new security vulnerabilities information to the administrators and customers based on the security checks, and generate audit records as receipt of the new security vulnerabilities information.

According to at least one implementation of the present embodiment, a check for new security vulnerabilities information may be performed. Next, based on the new security vulnerabilities information, alerts may be sent to security vulnerability administrators. Then, credentials for the security vulnerability administrators may be checked. Next, credentials for customers may be authenticated. Then, security vulnerability administrators may be prompted to acknowledge sharing restrictions associated with the new security vulnerability information. Next, receipt of the new security vulnerability information may be acknowledged by sending audit records to product suppliers. Then, the new security vulnerabilities information may be presented to the security vulnerability administrators and customers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for providing security vulnerability information.

According to at least one implementation, a check for new security vulnerabilities information may be performed. Next, based on the new security vulnerabilities information, alerts may be sent to security vulnerability administrators. Then, credentials for the security vulnerability administrators may be checked. Next, credentials for customers may be authenticated. Then, security vulnerability administrators may be prompted to acknowledge sharing restrictions associated with the new security vulnerability information. Next, receipt of the new security vulnerability information may be acknowledged by sending audit records to product suppliers. Then, the new security vulnerabilities information may be presented to the security vulnerability administrators and customers.

Referring now to FIG. 1, an exemplary networked computer environment 100 in accordance with one embodiment is depicted. The networked computer environment 100 may include a computer 102 with a processor 104 and a data storage device 106 that is enabled to run a security vulnerability information program 108A and a software program 114. The software program 114 may be an application program such as an internet browser and an email program. The security vulnerability information program 108A may communicate with the software program 114. The networked computer environment 100 may also include a server 112 that is enabled to run a security vulnerability information program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the security vulnerability information program 108A, 108B may interact with a database 116 that may be embedded in various storage devices, such as, but not limited to a mobile device 102, a networked server 112, or a cloud storage service.

According to the present embodiment, a program, such as a security vulnerability information program 108A and 108B may run on the client computer 102 or on the server computer 112 via a communications network 110. The security vulnerability information program 108A, 108B may provide new security vulnerability information to client environments. Specifically, a user using a computer, such as computer 102, may run a security vulnerability information program 108A, 108B, that interacts with a software program 114, to check for new security vulnerability information associated with product suppliers, send alerts to security vulnerability administrators based on the discovery of new security vulnerability information, and run security checks on security vulnerability administrators and customers before presenting the new security vulnerability information.

Figure 2:
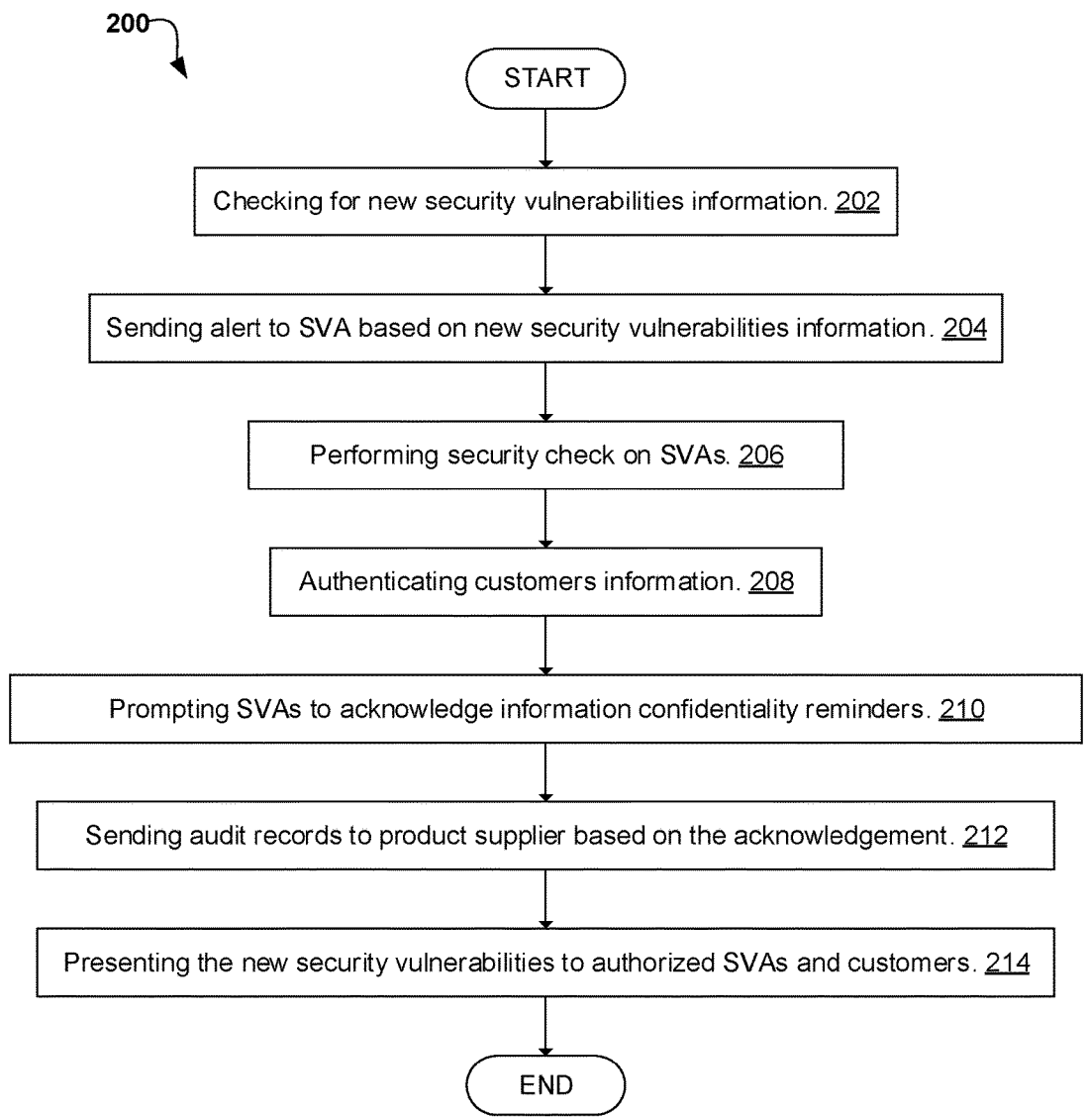
FIG. 2 is an operational flowchart illustrating the steps carried out by a program for providing a plurality of security vulnerability information according to one embodiment.

Referring now to FIG. 2, an operational flowchart 200 illustrating the steps carried out by a program for providing new security vulnerability information is depicted. At 202, the security vulnerability information program 108A, 108B (FIG. 1) may check for new security vulnerability information. Specifically, according to one embodiment, the security vulnerability information program 108A, 108B (FIG. 1) may access product supplier databases associated with program products running on client environments to determine whether new security vulnerability exposure information is available. For example, the security vulnerability information program 108A, 108B (FIG. 1) may access a product supplier database associated with a product running on a client environment to check for new security vulnerabilities exposure information that may include security patches for installation to resolve integrity issues, such as malware, configuration problems, product inventory and maintenance levels.

Next, at 204, the security vulnerability information program 108A, 108B (FIG. 1) may send alerts to security vulnerability administrators (hereinafter SVA) based on the new security vulnerability information. Specifically, when new security vulnerability information is available, the security vulnerability information program 108A, 108B (FIG. 1) may alert SVAs by sending notifications informing the SVAs that the new security vulnerability information is available. Furthermore, according to one embodiment, SVAs may be entrusted IT personnel for client environments. For example, and as previously described at step 202, the security vulnerability information program 108A, 108B (FIG. 1) may access product supplier databases associated with a program product to determine that new security vulnerabilities exposure information, which may include security patches to resolve malware attacks, may be available. As such, the security vulnerability information program 108A, 108B (FIG. 1) may send alerts, such as pop-notifications and/or email alerts, to SVAs associated with the client environments to inform the SVAs that new security vulnerability exposure information is available.

Then, at 206, the security vulnerability information program 108A, 108B (FIG. 1) may perform security checks on SVAs. Specifically, according to one embodiment, prior to presenting SVAs with the new security vulnerability information, the security vulnerability information program 108A, 108B (FIG. 1) may perform security checks on the SVAs to authorize the SVAs to receive the new security vulnerability information. For example, and as previously described at step 202, the security vulnerability information program 108A, 108B (FIG. 1) may check for and determine that new security vulnerability information is available. Then, at step 204 the security vulnerability information program 108A, 108B (FIG. 1) may send alerts to SVAs to notify the SVAs that the new security vulnerability information is available. Thereafter, the security vulnerability information program 108A, 108B (FIG. 1) may perform security checks on the SVAs, such as prompting the SVAs to enter passwords/security codes and/or verifying SVA information via digital certificates, to thereby authorize SVAs to receive the new security vulnerability exposure information.

Furthermore, at 208, the security vulnerability information program 108A, 108B (FIG. 1) may authenticate customer information. As previously described at step 206, prior to presenting SVAs with the new security vulnerability exposure information, the security vulnerability information program 108A, 108B (FIG. 1) may perform security checks on the SVAs. Similarly, the security vulnerability information program 108A, 108B (FIG. 1) may authenticate customer information. For example, the security vulnerability information program 108A, 108B (FIG. 1) may check for and determine that new security vulnerability exposure information associated with products is available. As such, according to one embodiment, the security vulnerability information program 108A, 108B (FIG. 1) may authenticate the customers by accessing the product supplier databases and verifying customer information to ensure that the customers are authorized to receive the new security vulnerability exposure information. Specifically, for example, the security vulnerability information program 108A, 108B (FIG. 1) may verify product licensing certificates that may include customer licensed product information to thereby ensure that authorized SVAs associated with licensed and authorized customers receive the new security vulnerability exposure information.

Next, at 210, the security vulnerability information program 108A, 108B (FIG. 1) may prompt the SVAs to acknowledge information confidentiality reminders. Specifically, the security vulnerability information program 108A, 108B (FIG. 1) may prompt the SVAs to acknowledge information confidentiality reminders that may include sharing restrictions associated with the new security vulnerability exposure information. For example, and as previously described at step 206, prior to presenting the SVAs with the new security vulnerability exposure information, the security vulnerability information program 108A, 108B (FIG. 1) may perform security checks on the SVAs to authorize the SVAs to receive the new security vulnerability exposure information. Furthermore, according to one embodiment, the security vulnerability information program 108A, 108B (FIG. 1) may prompt the SVAs to acknowledge an information confidentiality reminder that the SVAs are entrusted IT personnel and that the new security vulnerability exposure information may include confidential/non-public information. Specifically, for example, the security vulnerability information program 108A, 108B (FIG. 1) may prompt the SVAs using a message that may include a sharing restriction such as, "There is new security vulnerability exposure information for product XYZ, as the trusted administrator you must keep this information confidential", and to "Click 'OK' to proceed" to acknowledge the sharing restrictions.

Then, at 212, the security vulnerability information program 108A, 108B (FIG. 1) may send audit records to product suppliers based on the SVAs acknowledging the information confidentiality reminders. As previously described at step 210, the security vulnerability information program 108A, 108B (FIG. 1) may prompt the SVAs to acknowledge information confidentiality reminders. Thereafter, according to one embodiment, the security vulnerability information program 108A, 108B (FIG. 1) may send audit records to product suppliers to inform product suppliers that the SVAs and customers received the new security vulnerability exposure information. Specifically, the security vulnerability information program 108A, 108B (FIG. 1) may enable product suppliers to track that authorized SVAs and customers received the new security vulnerability exposure information by sending audit records to the product suppliers.

Next, at 214, the security vulnerability information program 108A, 108B (FIG. 1) may present the new security vulnerability exposure information to the authorized SVAs and customers. As previously described at step 202, the security vulnerability information program 108A, 108B (FIG. 1) may access product supplier databases to check for new security vulnerabilities exposure information that may include security patches to resolve integrity issues such as malware, configuration problems, product inventory, and maintenance levels. Furthermore, as previously described at steps 206-208, the security vulnerability information program 108A, 108B (FIG. 1) may authorize the SVAs and the customers to receive the new security vulnerabilities exposure information. As such, the security vulnerability information program 108A, 108B (FIG. 1) may present the new security vulnerability exposure information to the authorized SVAs and customers. For example, the security vulnerability information program 108A, 108B (FIG. 1) may present the new security vulnerability exposure information to the authorized SVAs using messages such as, "Warning! Please apply security patch INT0001 as soon as possible to resolve security integrity issues."

It may be appreciated that FIG. 2 provides only illustrations of one implementation and does not imply any limitations with regard to how different embodiments may be implemented. Many modifications to the depicted environments may be made based on design and implementation requirements. For example, in step 202, the security vulnerability information program 108A, 108B (FIG. 1) may check for new security vulnerability exposure information as well as determine whether SVAs are defined for the client environments. Specifically, the security vulnerability information program 108A, 108B (FIG. 1) may ensure that SVAs are defined at the client environments, to receive the new security vulnerability exposure information, by performing client environment checks. Furthermore, in response to no SVA being defined for a client environment, the security vulnerability information program 108A, 108B (FIG. 1) may send error notifications to the client environments that SVAs are not defined for the client environments. For example, the security vulnerability information program 108A, 108B (FIG. 1) may send an error notification stating, "SVA is NOT defined in your environment putting you at risk for security integrity issues, please define a SVA."

Figure 3:
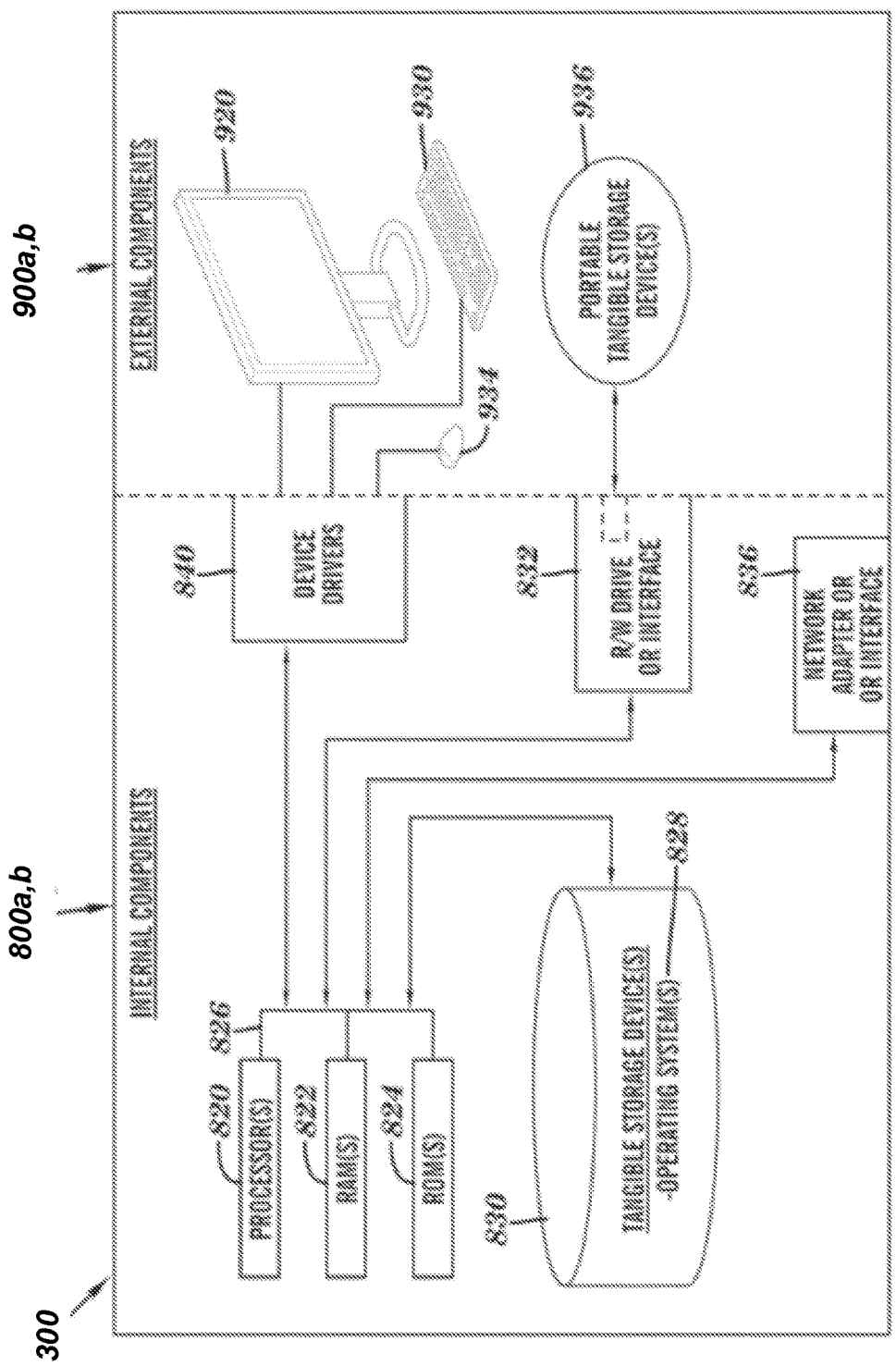
FIG. 3 is a block diagram of the system architecture of a program for providing a plurality of security vulnerability information according to one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 3. Each of the sets of internal components 800 a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the security vulnerability information program 108A (FIG. 1) in client computer 102 (FIG. 1), and the security vulnerability information program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a security vulnerability information program 108A and 108B (FIG. 1), can be stored on one or more of the respective portable computer-readable tangible storage devices 936, read via the respective R/W drive or interface 832 and loaded into the respective hard drive 830.

Each set of internal components 800 *a, b* also includes network adapters or interfaces 836 such as a TCP/IP adapter cards, wireless Wi-Fi interface cards, or 3G or 4G wireless interface cards or other wired or wireless communication links. The security vulnerability information program 108A (FIG. 1) and software program 114 (FIG. 1) in client computer 102 (FIG. 1), and the security vulnerability information program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the security vulnerability information program 108A (FIG. 1) and software program 114 (FIG. 1) in client computer 102 (FIG. 1) and the security vulnerability information program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
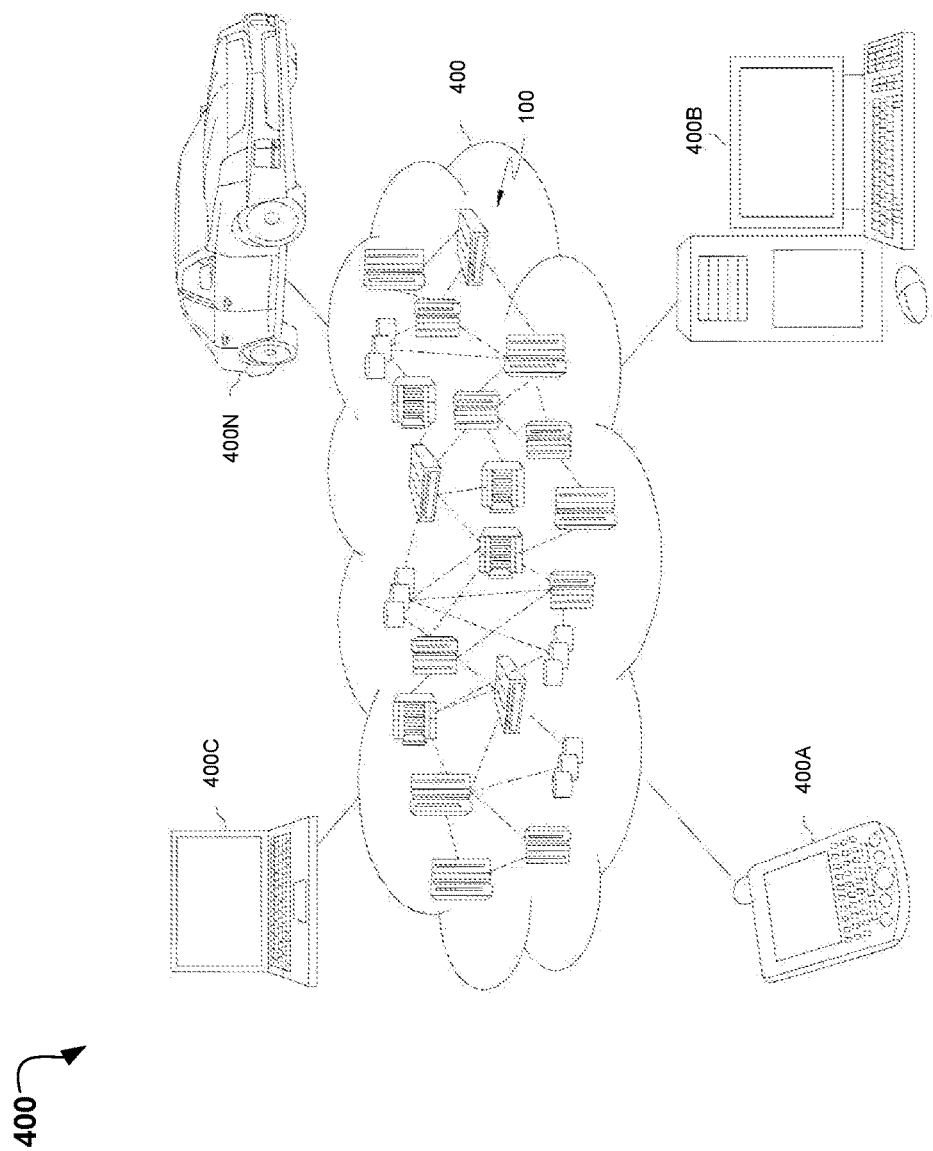
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
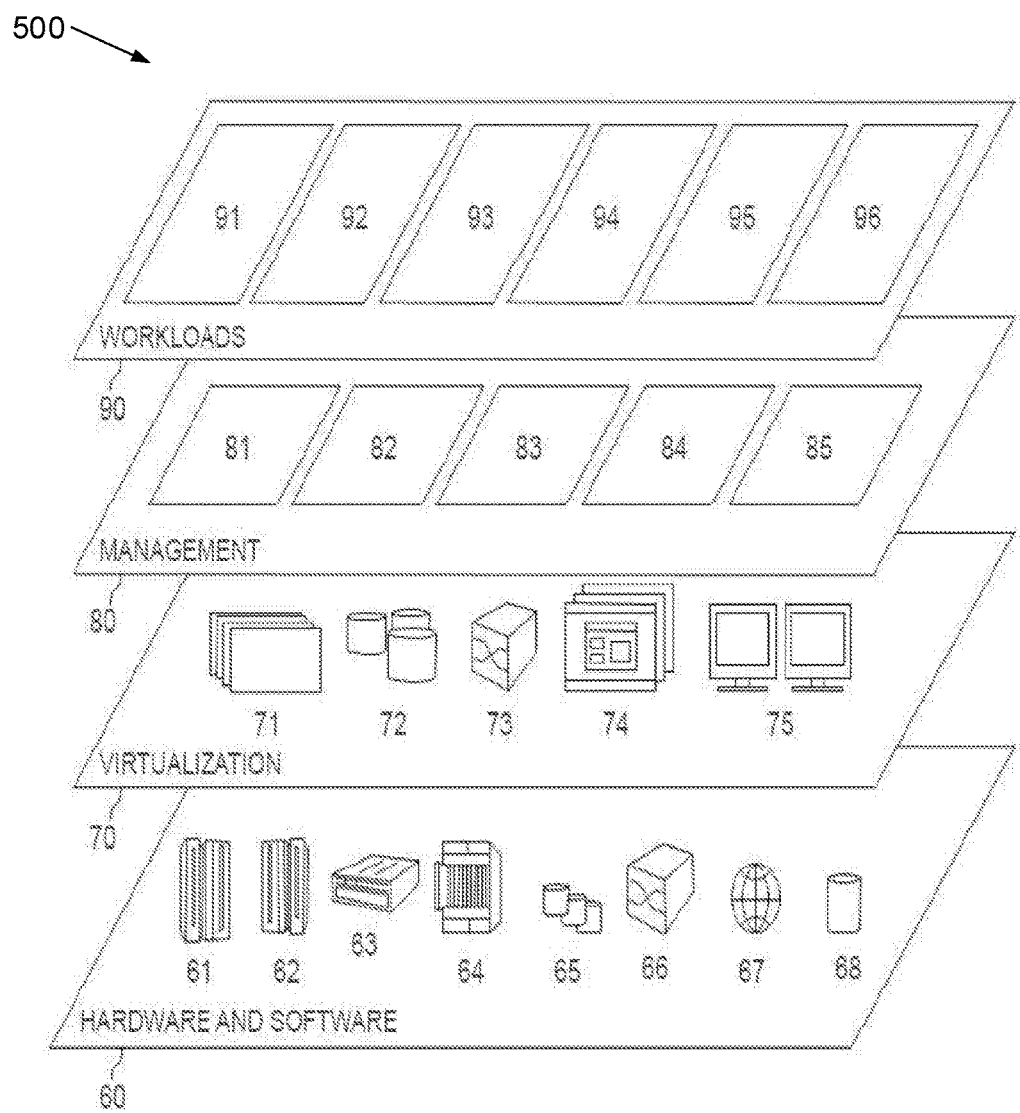
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Security Vulnerability Information 96. A Security Vulnerability Information Program 108A, 108B (FIG. 1) may be offered "as a service in the cloud" (i.e., Software as a Service (SaaS)) for applications running on mobile devices 102 (FIG. 1) and may provide security patches to SVAs and customers associated with client environments based on received security vulnerability information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for providing a plurality of security vulnerability information, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   checking for the plurality of security vulnerability information on at least one product supplier server, wherein the plurality of security vulnerability information comprises at least one security installation patch, and wherein the at least one security installation patch resolves at least one security integrity issue selected from a group comprising at least one of a malware, a configuration problem, a product inventory and a maintenance level;
   in response to finding the plurality of security vulnerability information on the at least one product supplier server, sending at least one alert to at least one security vulnerability administrator (SVA) associated with a client environment, wherein the at least one alert is selected from a group comprising at least one of an email alert and a pop-up notification;
   performing at least one security check on the at least one SVA to authorize the at least one security vulnerability administrator to receive the plurality of security vulnerability information, wherein performing the at least one security check on the at least one SVA further comprises at least one of prompting the at least one SVA to enter at least one password, and verifying a plurality of data associated with the at least one SVA via a digital certificate;
   authenticating at least one customer associated with the client environment to authorize the at least one customer to receive the plurality of security vulnerability information, wherein authenticating the at least one customer associated with the client environment further comprises verifying at least one customer licensed product certificate;

prompting the authorized at least one security vulnerability administrator to acknowledge an information confidentiality reminder to receive the plurality of security vulnerability information, wherein the information confidentiality reminder comprises at least one sharing restriction notification associated with the plurality of security vulnerability information;

in response to the authorized at least one security vulnerability administrator acknowledging the information confidentiality reminder, sending an audit record to the at least one product supplier server; and presenting the plurality of security vulnerability information to the authorized at least one security vulnerability administrator and the authorized at least one customer associated with the client environment.

* * * * *